US009547484B1

(12) United States Patent
Frazier et al.

(10) Patent No.: US 9,547,484 B1
(45) Date of Patent: Jan. 17, 2017

(54) AUTOMATED COMPILER OPERATION VERIFICATION

(71) Applicant: International Business Machines Corporation, Armonk, NY (US)

(72) Inventors: Giles R. Frazier, Austin, TX (US); Michael Karl Gschwind, Chappaqua, NY (US); Christian Jacobi, Poughkeepsie, NY (US); Anthony Saporito, Highland, NY (US); Chung-Lung K. Shum, Wappingers Falls, NY (US); Joran S. C. Siu, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/987,400

(22) Filed: Jan. 4, 2016

(51) Int. Cl.
*G06F 9/45* (2006.01)
(52) U.S. Cl.
CPC .................................. *G06F 8/443* (2013.01)
(58) Field of Classification Search
None
See application file for complete search history.

(56) References Cited

U.S. PATENT DOCUMENTS

| | | | | |
|---|---|---|---|---|
| 5,809,450 A | * | 9/1998 | Chrysos | G06F 8/445 702/186 |
| 5,966,536 A | * | 10/1999 | Ravichandran | G06F 8/443 714/E11.192 |
| 6,067,575 A | * | 5/2000 | McManis | G06F 8/41 717/140 |
| 6,378,087 B1 | | 4/2002 | Flanagan et al. | |
| 7,493,388 B2 | * | 2/2009 | Wen | G06F 9/50 705/28 |

(Continued)

OTHER PUBLICATIONS

Dubach, Christophe, et al. "Fast compiler optimisation evaluation using code-feature based performance prediction." Proceedings of the 4th international conference on Computing frontiers. ACM, 2007.*

(Continued)

*Primary Examiner* — Matthew Brophy
(74) *Attorney, Agent, or Firm* — Cantor Colburn LLP; William A. Kinnaman, Jr.

(57) ABSTRACT

Techniques relate to automated compiler operation verification. In response to performing an optimization to a compiler configured to execute on a processor of a computer system, a determination is made of whether a fingerprint is present in software that is currently executing on the processor of the computer system. The software is compiled by the compiler, and the fingerprint comprises a representation of a sequence of behavior that occurs on the processor while the software is executing. The fingerprint is configured to correspond to the optimization of the compiler. In response to determining that the fingerprint is not present in the software currently executing on the processor, a determination is made that optimization to the compiler has not occurred. In response to determining that the fingerprint is present in the software executing on the processor, a verification is made that the optimization of the compiler has occurred.

17 Claims, 11 Drawing Sheets

(56) References Cited

U.S. PATENT DOCUMENTS

| | | | | |
|---|---|---|---|---|
| 7,730,469 | B1* | 6/2010 | Boucher | G06F 8/443 717/151 |
| 8,407,186 | B1 | 3/2013 | Cremelie et al. | |
| 8,516,448 | B2 | 8/2013 | Morgia et al. | |
| 8,554,811 | B2 | 10/2013 | Mariani et al. | |
| 8,782,613 | B2* | 7/2014 | Hines | 717/127 |
| 8,892,570 | B2 | 11/2014 | Bauer | |
| 8,972,975 | B1* | 3/2015 | Rogers | G06F 8/61 717/154 |
| 9,003,529 | B2* | 4/2015 | Lospinuso | G06F 21/562 726/22 |
| 9,031,922 | B2* | 5/2015 | Andrew | G06F 8/71 707/698 |
| 9,111,095 | B2* | 8/2015 | Cohen | G06F 21/562 |
| 9,395,961 | B1* | 7/2016 | Bradbury | G06F 8/443 |
| 9,424,012 | B1* | 8/2016 | Frazier | G06F 8/443 |
| 2004/0098710 | A1* | 5/2004 | Radigan | G06F 8/433 717/144 |
| 2008/0307403 | A1* | 12/2008 | Heishi | G06F 8/441 717/153 |
| 2009/0313615 | A1* | 12/2009 | Joshi | G06F 11/3612 717/154 |
| 2013/0139137 | A1* | 5/2013 | Zhao | G06F 8/443 717/158 |
| 2013/0212073 | A1* | 8/2013 | Cochrane | G09B 7/02 707/687 |
| 2013/0332710 | A1* | 12/2013 | Kruglick | G06F 9/45525 712/226 |
| 2014/0101113 | A1 | 4/2014 | Zhang et al. | |
| 2014/0149971 | A1* | 5/2014 | Kawachiya | G06F 9/45516 717/148 |
| 2014/0181488 | A1* | 6/2014 | Sama | G06F 21/00 713/1 |
| 2014/0297779 | A1 | 10/2014 | Pack et al. | |
| 2015/0089204 | A1 | 3/2015 | Henry et al. | |
| 2015/0089484 | A1* | 3/2015 | Halambi | G06F 9/45516 717/148 |
| 2015/0186649 | A1* | 7/2015 | Humble | G06F 21/564 726/23 |
| 2015/0234736 | A1* | 8/2015 | Koju | G06F 11/3692 717/131 |
| 2015/0277876 | A1* | 10/2015 | Yamanaka | G06F 8/443 717/152 |
| 2015/0278490 | A1 | 10/2015 | Rogers et al. | |
| 2015/0365437 | A1* | 12/2015 | Bell, Jr. | H04L 63/20 726/1 |

OTHER PUBLICATIONS

Moseley, Tipp, Dirk Grunwald, and Ramesh Per "Chainsaw: Using binary matching for relative instruction mix comparison." Parallel Architectures and Compilation Techniques, 2009. PACT'09. 18th International Conference on. IEEE, 2009.*

Triantafyllis, Spyridon, et al. "Compiler optimization-space exploration." Code Generation and Optimization, 2003. CGO 2003. International Symposium on. IEEE, 2003.*

Tiwari, Ananta, et al. "A scalable auto-tuning framework for compiler optimization." Parallel & Distributed Processing, 2009. IPDPS 2009. IEEE International Symposium on. IEEE, 2009.*

Bala, Vasanth, Evelyn Duesterwald, and Sanjeev Banerjia. "Dynamo: a transparent dynamic optimization system." ACM SIGPLAN Notices 35.5 (2000): 1-12.*

C. S. Collberg, et al.,"Dynamic Graph-Based Software Fingerprinting", ACM Transactions on Programming Languages and Systems, vol. 29, No. 6, Article 35, Oct. 2007, pp. 1-67.

Giles R. Frazier, et al., "Configurable Code Fingerprint," U.S. Appl. No. 14/987,220, filed Jan. 4, 2016.

Giles R. Frazier, et al., "Programmable Code Fingerprint," U.S. Appl. No. 14/987,263, filed Jan. 4, 2016.

Giles R. Frazier, et al.,"Code Fingerprint-Based Processor Malfunction Detection," U.S. Appl. No. 14/987,395, filed Jan. 4, 2016.

Giles R. Frazier, et al.,"Scheme for Verifying the Effects of Program Optimizations," U.S. Appl. No. 14/987,377, filed Jan. 4, 2016.

IBM, "Power ISA V 2.07B," Power.org, Book I, Apr. 9, 2015, pp. 32-732.

IBM, "Power ISA V 2.07B," Power.org, Book II, Apr. 9, 2015, pp. 733-838.

IBM, "Power ISA V 2.07B," Power.org, Book III-S, Apr. 9, 2015, pp. 839-1020.

J.C. Smolens, et al.,"Fingerprinting: Bounding Soft-Error Detection Latency and Bandwidth", ACM, ASPLOS, Oct. 9-13, 2004, pp. 1-11.

List of IBM Patents or Patent Applications Treated as Related; filed Jan. 4, 2016, pp. 1-2.

Jonathan D. Bradbury, et al.,"Behavior Based Code Recompilation Triggering Scheme," U.S. Appl. No. 14/987,346, filed Jan. 4, 2016.

* cited by examiner

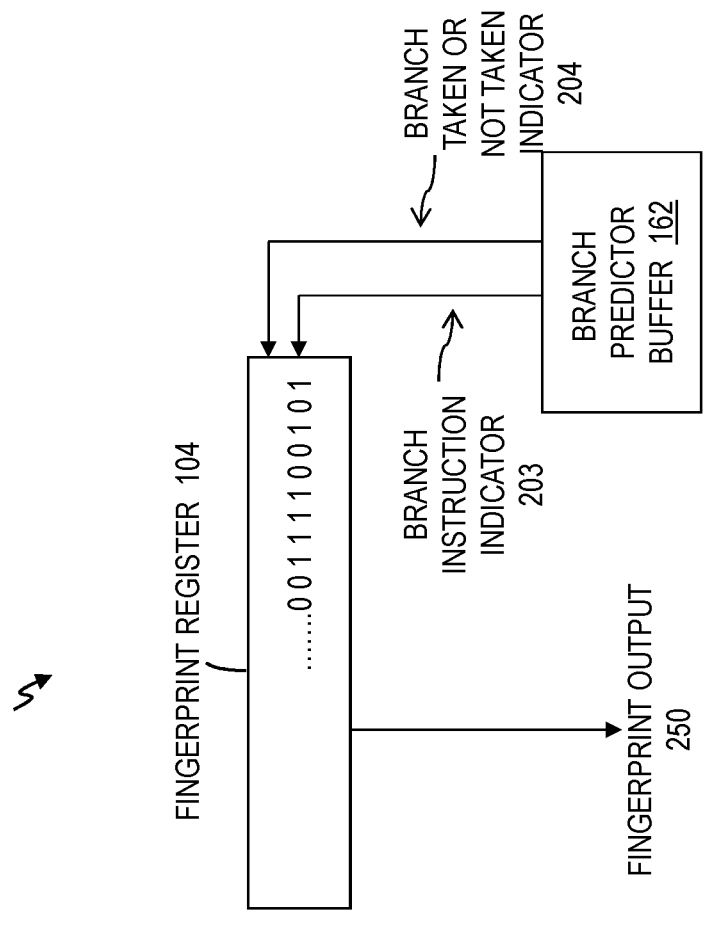

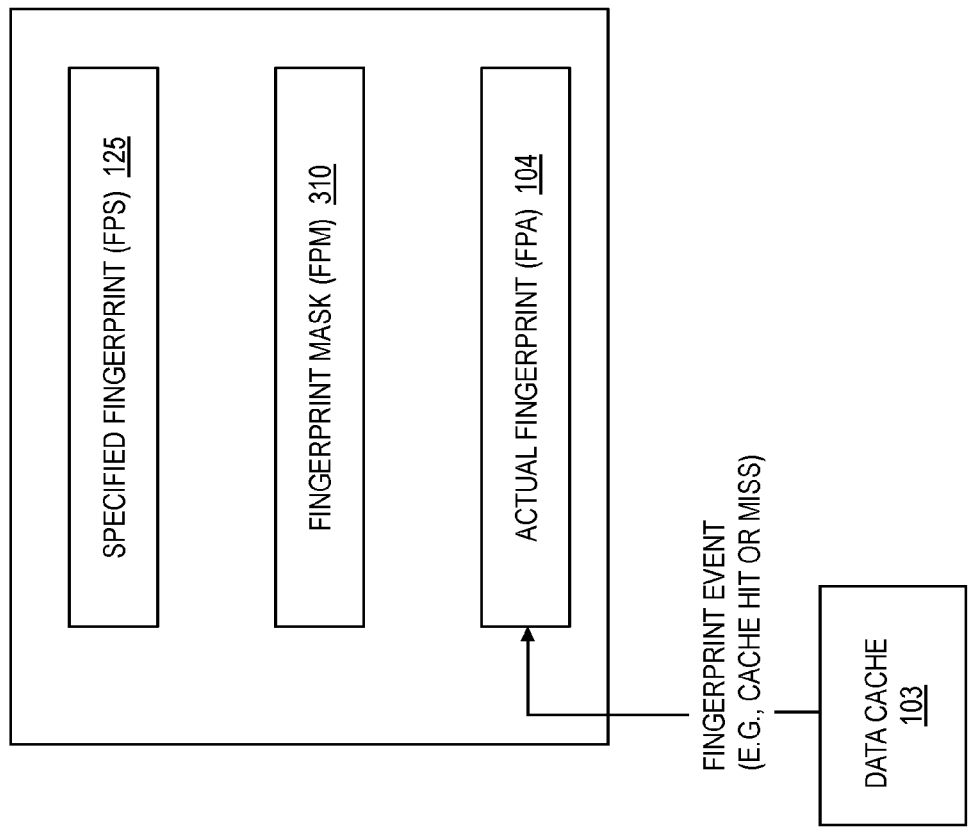

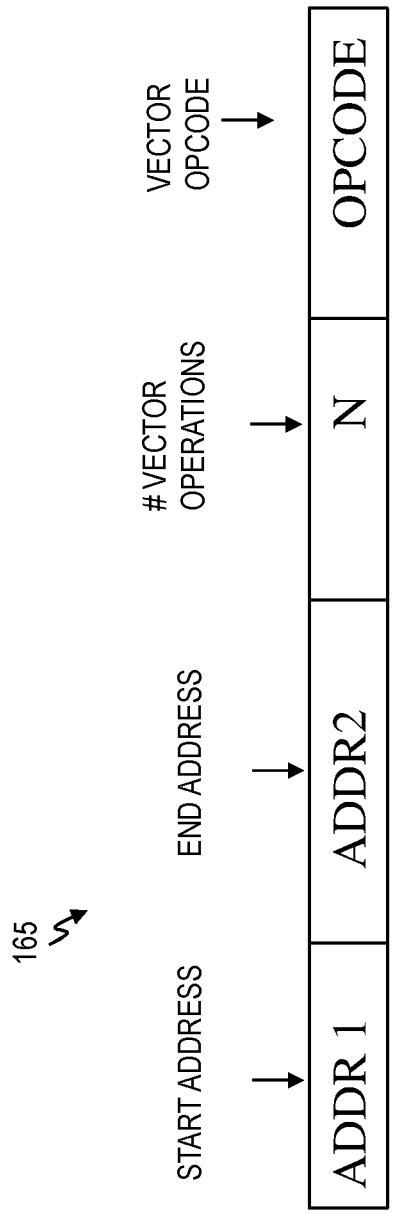

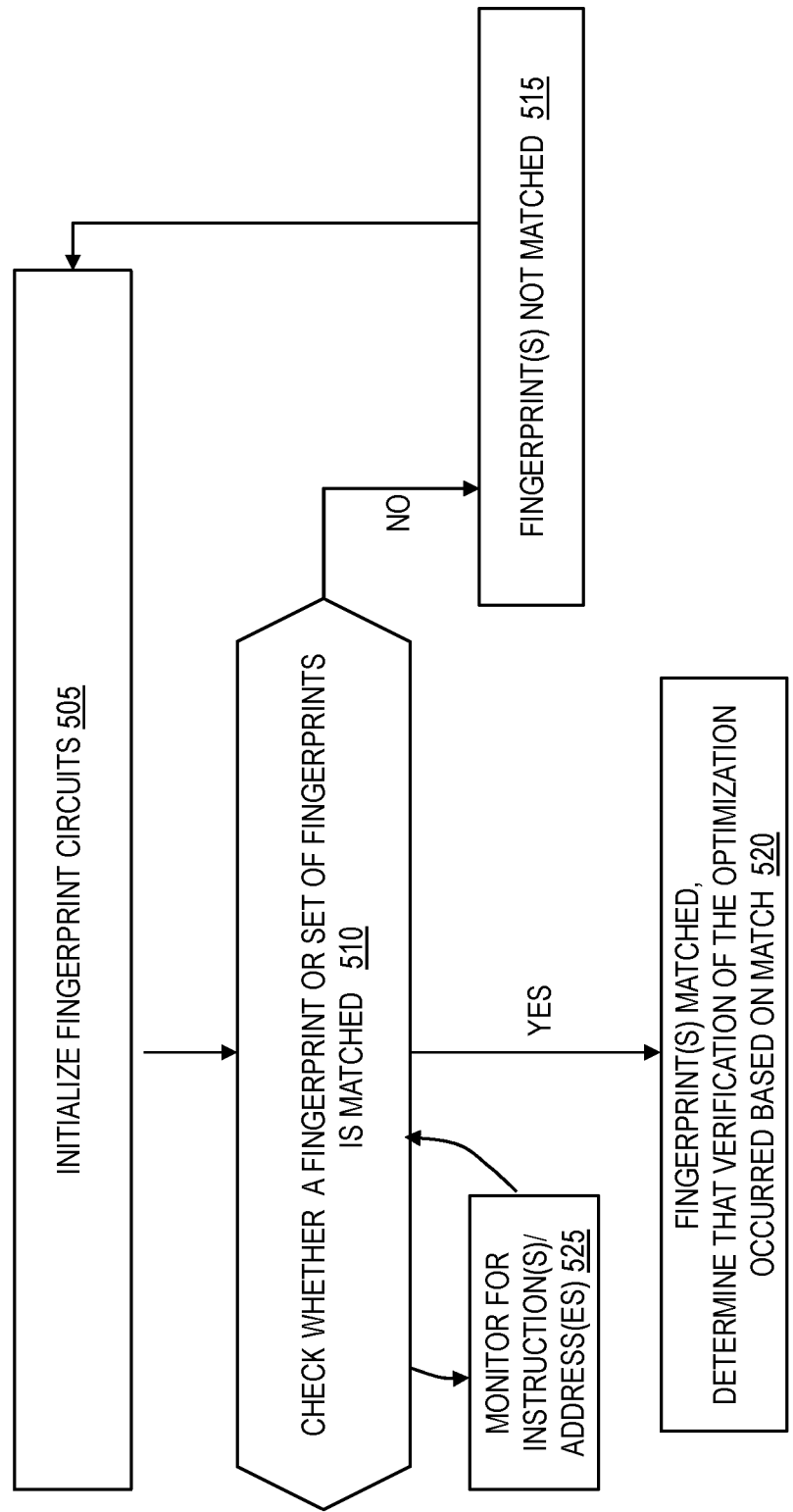

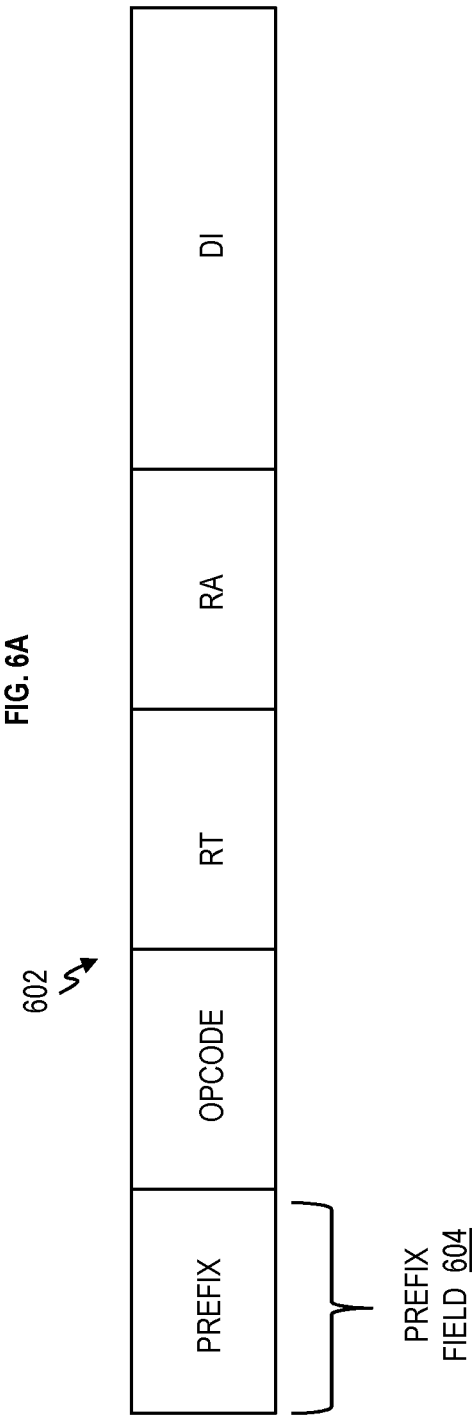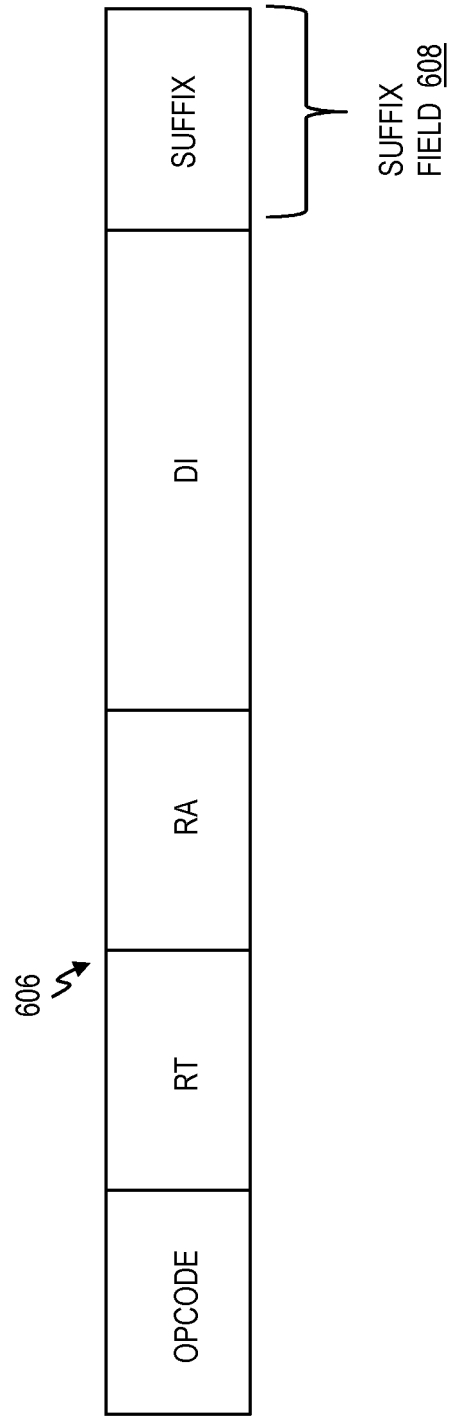

```
<Assume R1 = 32>
ADDR1:  ldx   R0, R3,R1
        add   R4, R0, R2
        std   R4, R3,R1
        addi  R1, -8
        bne   R1, ADDR1
ADDR2   . . .
```

FIG. 8

| ADDR1 | ld | R0, 32(R3) |
|---|---|---|
| | ld | R6, 24(R3) |
| | ld | R10, 16(R3) |
| | ld | R14, 8(R3) |
| | add | R4, R0, R2 |
| | add | R8, R6, R2 |
| | add | R12, R10, R2 |
| | add | R16, R14, R2 |
| | std | R4, 32(R3) |
| | std | R8, 24(R3) |
| | std | R12, 16(R3) |
| | std | R16, 8(R3) |
| ADDR2 | ... | |

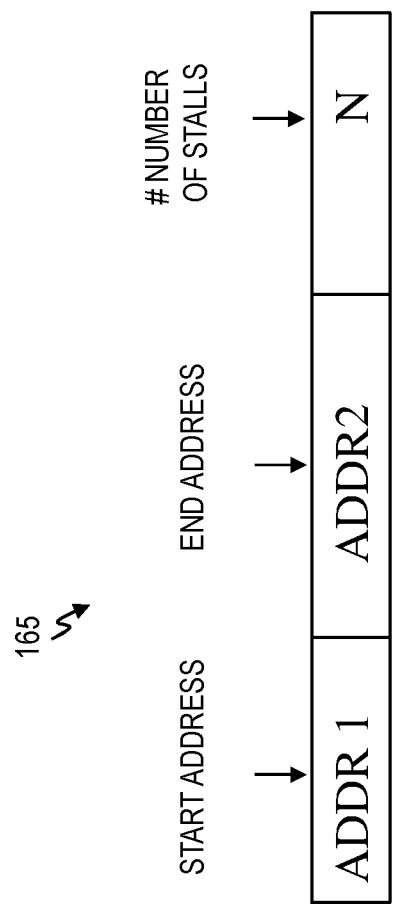

AUTOMATED COMPILER OPERATION VERIFICATION

BACKGROUND

The present invention relates generally to computer processors, and more specifically, to automated compiler operation verification executed by a processor.

A compiler is a computer program (or a set of programs) that transforms source code written in a programming language (the source language) into another computer language (the target language), with the latter sometimes having a binary form known as object code. The most common reason for converting a source code is to create an executable program.

In computing, an optimizing compiler is a compiler that tries to minimize or maximize some attributes of an executable computer program. The most common requirement is to minimize the time taken to execute a program. A less common optimization is to minimize the amount of memory occupied. The growth of portable computers has created a market for minimizing the power consumed by a program. Compiler optimization is generally implemented using a sequence of optimizing transformations, which may be algorithms that take a program and transform it to produce a semantically equivalent output program that provides better performance and/or uses fewer resources.

SUMMARY

Embodiments include a method, system, and computer program product for automated compiler operation verification. In response to performing an optimization to a compiler configured to execute on a processor of a computer system, a determination is made of whether a fingerprint is present in software that is currently executing on the processor of the computer system. The software is compiled by the compiler, and the fingerprint comprises a representation of a sequence of behavior that occurs on the processor while the software is executing. The fingerprint is configured to correspond to the optimization of the compiler. In response to determining that the fingerprint is not present in the software currently executing on the processor, a determination is made that optimization to the compiler has not occurred. In response to determining that the fingerprint is present in the software executing on the processor, a verification is made that the optimization of the compiler has occurred.

BRIEF DESCRIPTION OF THE DRAWINGS

FIG. 2 depicts a fingerprint recognition function of a fingerprint circuit in accordance with an embodiment.

FIG. 3 depicts a fingerprint recognition function of the fingerprint circuit in accordance with an embodiment.

FIG. 4 depicts an example fingerprint table according to an embodiment.

FIG. 5 depicts a flow chart of automated compiler operation verification in accordance with an embodiment.

FIG. 6A depicts an instruction with an example prefix field for a prefix according to an embodiment.

FIG. 6B depicts an instruction with an example suffix field for a suffix according to an embodiment.

FIG. 7 depicts an example loop that is to be optimized according to an embodiment.

FIG. 8 depicts an unrolled loop that is an optimization of FIG. 7 according to an embodiment.

FIG. 11 depicts an example fingerprint table according to an embodiment.

DETAILED DESCRIPTION

Figure 1:
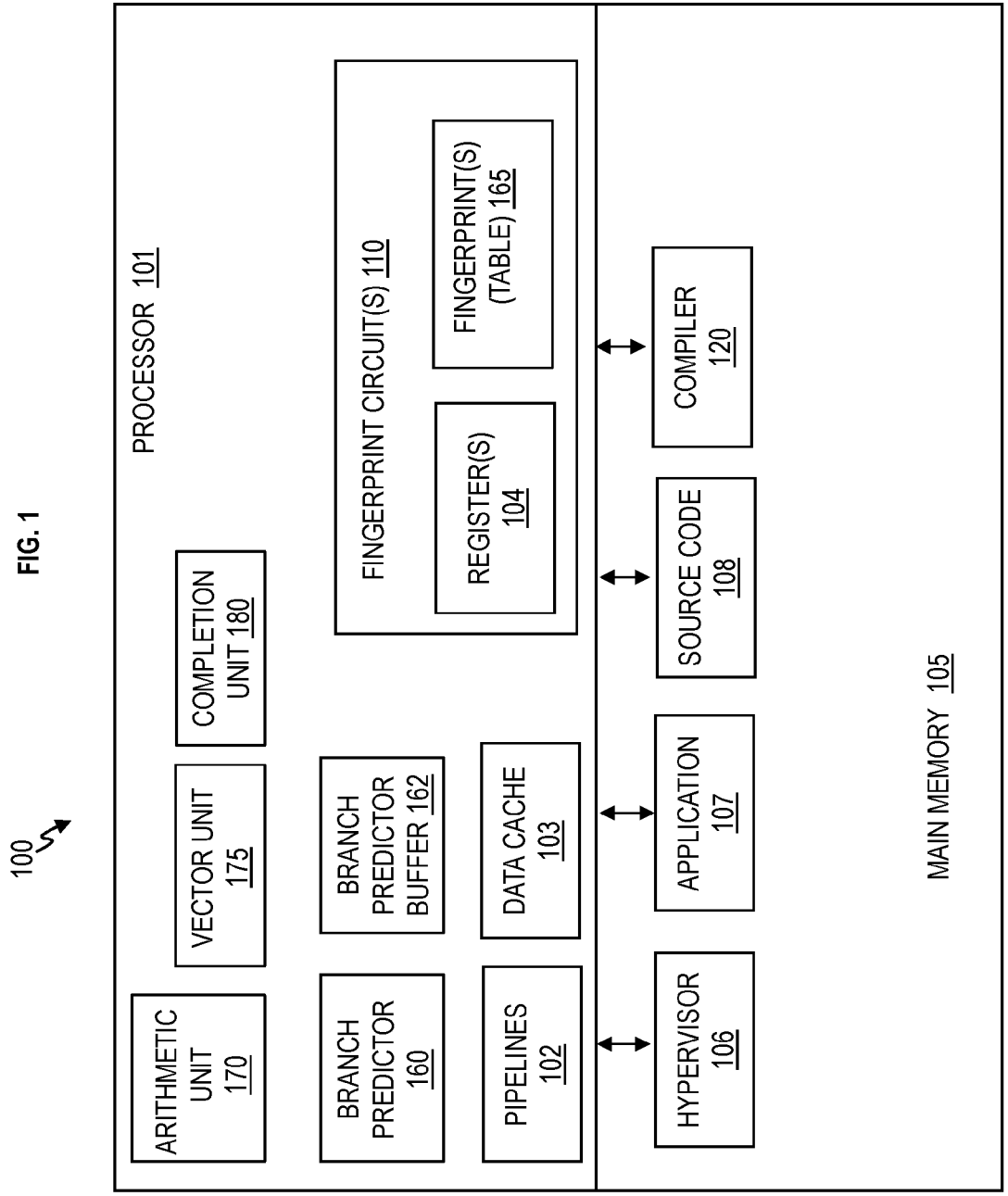
FIG. 1 depicts a computer system for implementing automated compiler operation verification in accordance with an embodiment.

In order to ensure that an optimizing compiler is functioning as intended, it is often desirable to verify that the compiler actually makes the optimization that it is designed to make. For example, if an optimizing compiler has been designed to unroll nested loops, there is a need to verify that the generated software code actually unrolls the loops when intended and that the goal for the optimization is met. In the state-of-the art, the process of making this verification involves tracing the compiled program, and manually examining the trace to determine if the expected optimization has been correctly done. This is a time consuming and expensive process. However, embodiments provide an automated technique for verifying that an optimizing compiler is generating source code that it is designed to generate without any need for manual analysis.

State-of-the-art processors contain performance monitors that typically count a wide variety of events such as cache misses, branch mispredictions, stall cycles, etc. These counters, however, provide no information about the sequence of the events that they count. That is, a branch miss counter provides a total count of branch misses but no indication of the sequence of branch instruction hits and misses that resulted in the total miss count. Thus, if an optimizing compiler has performed an optimization that is intended to cause a particular sequence of branch hits and misses, the state-of-the-art performance monitor counters cannot verify that the particular sequence has occurred.

Some state-of-the-art processors also contain branch history buffers. These buffers contain a recent history of branch instruction addresses for branches that were taken. This sequence of taken branch instruction addresses can be used to identify the execution path, and thus is of some use in verifying that a compiler has made certain changes to the code, but these buffers are typically limited in size. They also do not provide any information about sequences of events such as cache or branch prediction hits and misses, and it is often the sequences of these types of events that optimizations are designed to change. As a result, in the state-of-the-art, existing compiler optimization verification involves extracting traces of the optimized program, executing them on debug tools, and performing a tedious analysis of the program behavior. Thus, state-of-the-art technology does not provide the necessary support for streamlined compiler verification. As a result, the verification process is time consuming and incomplete.

Embodiments use a code fingerprint recognizer to verify that the optimization performed by an optimizing compiler is actually occurring. The use of the code fingerprint recognition apparatus eliminates the need for costly, inaccurate, and time-consuming manual analysis of program traces that would otherwise be necessary to verify that a compiler is actually making the exact code changes intended.

Embodiments provide the means to monitor program execution and detect whether or not a specified fingerprint is exhibited by the program. Since fingerprints reveal many more details about program execution than is available from performance monitor counters, the fingerprint circuit makes it possible to determine whether or not a compiler optimization has actually made the intended changes. This detailed information is provided immediately by the hardware.

Now turning to the figures, FIG. 1 depicts a computer system 100 configured to implement automated compiler operation in accordance with an embodiment. The computer system 100 includes a processor 101 in communication with a main memory 105. The processor 101 includes one or more processor pipelines 102 that execute instructions using cache memory 103. Computer programs, such as hypervisor 106, application 107, and source code 108, are stored in main memory 105 and executed by the processor 101. Any appropriate number of applications may be executed by a computer system such as computer system 100. The computer system 100 may also include source code 108 that may be complied by a compiler 120 for execution on the processor 101. The hypervisor 106, applications 107, source code 108, and/or any other program stored in main memory 105 may all be considered software programs, software, code, etc.

The processor 101 includes a branch predictor 160. The branch predictor 160 may be a digital circuit designed to predict either the direction (e.g., taken or not taken) and target address of a branch instruction before it is executed. The purpose of the branch predictor 160 is to improve the flow of instructions in the pipeline of the processor 101. The history of whether a branch instruction at a given address is taken or not taken, and in some cases target address of the branch instruction, is stored in the branch predictor buffer 162.

The processor 101 includes one or more fingerprint circuits 110 designed to monitor the execution of software programs (e.g., application 107, hypervisor 106, source code 108) on the processor 101. The fingerprint circuit 110 includes predefined/specified code fingerprints 165. The fingerprint circuit 110 is configured to automatically monitor the software program execution of, e.g., the application 107, in order to recognize the occurrence of a specified fingerprint 165 which indicates verification of the optimization. The fingerprint circuit 110 is also configured to alert the application program 107 at that point (i.e., the segment of code) at which an expected fingerprint indicative of an optimization is not recognized. When the specified fingerprint 165 indicative of an optimization is not recognized during execution of the software, the fingerprint circuit 110 is configured to issue an Event-Based Branch (EBB), also referred to as a "lightweight interrupt." The software program is therefore able to immediately analyze the code and state of the processor at the point at which the optimization should have been recognized and rapidly take the necessary corrective action.

Various counters and modules may be utilized to count incoming events and compare against a predefined number of events to determine when a fingerprint is recognized. FIG. 1 may include a fingerprint recognition function in the fingerprint circuit 110 according to an embodiment for which fingerprints 165 consist of counts of event occurrences between two specified instructions. Examples of such fingerprints may include a count of pipeline stalls, data cache prefetch misses, branch taken/not taken prediction misses, and/or a branch target hit/miss prediction hits/misses. It is appreciated that other fingerprints may also be included in the hardware of the fingerprint circuits 110.

The fingerprint circuit 110 may comprise one or more fingerprint shift registers 104 in some embodiments. The fingerprint shift register 104 is used to store the output of the software code that is currently executing, such that the output (value) of the fingerprint shift register 104 is compared to the fingerprint 165 to determine a match. The fingerprint shift register 104 is a physical register that contains measured fingerprints. Also, the fingerprint circuit 110 includes logic circuits to function as discussed herein. In one implementation, the fingerprint circuit 110 may also include firmware, microcode, etc., to execute the functions discussed herein.

In one implementation, the fingerprint circuit 110 may monitor execution of the software program 107 in order to determine a match to a single specified fingerprint 165. In response to finding the match, the fingerprint circuit 110 is configured to indicate that the intended optimization has occurred.

In another implementation, the fingerprint circuit 110 may monitor execution of the software program 107 in order to determine a match to a combination (set) of specified fingerprints 165, such as two or more different specified fingerprints 165. In response to finding the match to the combination of specified fingerprints 165 (e.g., two or more different specified fingerprints 165), the fingerprint circuit 110 is configured to indicate that the specified fingerprint has been recognized and determine that that the intended optimization to the compiler 120 has taken effect. However, when the specified fingerprint(s) 165 are not recognized, the fingerprint circuit 110 is configured to determine that the optimization did not occur.

For illustration purposes and not limitation, a few examples of code fingerprints 165 are discussed.

1) One code fingerprint may be a data cache hit miss sequence. For example, the data cache hit and miss sequence may be [hit, hit, miss, miss, hit, miss, miss] for one code fingerprint. This same data cache hit and miss sequence may be represented by [1100100] in the fingerprint shift register 104, where '1' represents a hit and '0' represents a miss. In one implementation, the fingerprint register 104 may store the actual output of the software program 107 currently executing on the processor 101, such that the fingerprint circuit 110 can check the fingerprint shift register 104 and recognize when the output of the software program 107 in the fingerprint shift register 104 matches the data cache hit miss sequence of an expected fingerprint 165.

2) Another code fingerprint may be a data cache hit miss sequence that is present when a given instruction is executed. The given instruction may have a predefined address (XYZ). As noted above for illustration purposes, the data cache hit miss sequence may be the sequence of cache hits and misses [hit, hit, miss, miss, hit, miss, miss] that occurred in load instructions leading up to the instruction at address XYZ. In this case, the fingerprint circuit 110 waits for execution of the given instruction of the software program 107 and only checks the fingerprint register 104 at the time when the given instruction (with address XYZ) executes.

3) A code fingerprint may be branch prediction hit miss sequence for a specific set of branches identified by an instruction prefix. In such an embodiment, branch instructions have an operand that identifies whether or not they are to be used in the fingerprint. When a branch with an operand indicating that it is part of the fingerprint is executed, either a 1 or a 0 is shifted into fingerprint register 104, depending on whether the prediction was a correct prediction or misprediction.

4) Another code fingerprint may be a branch history value when a given instruction is executed. In such an embodiment, the fingerprint consists of a sequence of 0's and 1's, where 1 means the branch was taken, and 0 means the branch was not taken. When a branch instruction is executed, either a 1 or a 0 is shifted into fingerprint register 104, depending on whether the branch was taken or not taken.

5) A code fingerprint may be a call signature at a given instruction, where the call signature is a binary value that is a function of the sequence of call and return instructions that have previously been executed when an instruction is executed. Such a fingerprint may also be a historical sequence of successive call signatures at a given instruction that consists of a number of most-recent values of the call signature at the given instruction.

6) Another code fingerprint may be the value of come from address register (CFAR) of the processor 101 at a given instruction, where the CFAR contains the address of the most-recently executed branch instruction that was taken.

7) There may also be code fingerprints that consist of counts of various events that occur between two instructions, such as pipeline cache stalls, data cache hits or misses, etc.

In embodiments, it should be appreciated that the fingerprint circuit 110 provides the ability to specify a particular fingerprint, and to continuously monitor execution of a software program while checking if that fingerprint is recognized. Upon recognition of the fingerprint, the fingerprint circuit 110 recognizes a verification that the intended optimization has occurred and allows the program to execute without interruption. However, if the fingerprint is not matched/recognized, the fingerprint circuit 110 immediately issues a lightweight interrupt that alerts software that the intended optimization has not occurred.

FIG. 2 depicts a fingerprint recognition function/detector of the fingerprint circuit 110 according to an embodiment. A fingerprint recognition function/detector may include hardware that detects, e.g., a branch instruction taken and branch instruction not taken fingerprint in the shift register. This shift register is referred to as the fingerprint register 104 in the processor 101, since the contents of the fingerprint register 104 represent the actual execution output of the processor 101 (actual fingerprint). In this case, the output may be the sequence of the branch taken and not taken history in the branch predictor buffer 162 and/or in the fingerprint register 104. Such a fingerprint register 104 may be of arbitrary length. In one implementation, either 32 or 64 bits may be suitable for the fingerprint register 104.

In FIG. 2, the sequence of 1's and 0's in the fingerprint register 104 may represent the most-recent history of branches taken and not taken, where a '0' indicates a branch not taken and a '1' indicates a branch taken, or register 104 may represent the most-recent history of data cache hits and misses, where a '0' indicates a data cache miss and a '1' indicates a data cache hit. An implementation may have one of these fingerprint registers 104 for each level of the cache. As shown in FIG. 2, fingerprint register 104 receives input from the branch predictor 160 via branch instruction indicator 203 and branch taken or not taken indicator 204. Whenever branch instruction indicator 203 indicates a branch instruction, a '1' is input into the fingerprint shift register 104 if the branch instruction results in a branch taken (i.e., the branch predictor 160 makes a successful branch prediction), and a '0' is loaded into the fingerprint shift register 104 when the branch instruction results in a branch not taken (i.e., the branch predictor 160 makes an unsuccessful branch prediction). An observed fingerprint is output on fingerprint output 250; the observed fingerprint gives a snapshot of the branch taken and not taken behavior of the current workload and may be used to identify the recent branch taken and not taken behavior of branch load instructions in the workload. The fingerprint register 104 may be of any appropriate size, and the observed fingerprint that is output on fingerprint output 250 may be the entire contents of the fingerprint register 104 in some embodiments. FIG. 2 is shown for illustrative purposes only; a fingerprint module comprising a shift register may measure any aspect of processor performance in various embodiments.

This type of fingerprint recognition function/detector of the fingerprint circuit 110 that detects branch taken and not taken sequences may be utilized to verify that an optimization, which intended to cause a certain program execution path to a given instruction to be taken, actually caused that path to be taken. After the optimization, the fingerprint register 104 is read by the fingerprint circuit 110 at the desired point in the software program in order to determine the execution path leading up to the point at which the fingerprint register 104 is read. The value of this fingerprint register 104 is then compared to the expected value of fingerprint 165 that would be expected to be present at that point if the compiler 120 performed the optimization properly. For example, to determine whether there is a match, the fingerprint circuit 110 compares the value of the fingerprint register 104 against the specified fingerprint 165. When there is a match, the fingerprint circuit 110 determines verification of the optimization, and the particular type of optimization corresponds to the type of specified fingerprint 165 and/or set of fingerprints 165 that have been matched. If there is no match between the value of this fingerprint register 104 and the expected value of the fingerprint 165, the verification has not performed as intended and a lightweight interrupt occurs.

Additionally, there may be another set of similar fingerprint registers 104 to indicate the sequence of the most-recent data cache hits and misses. In this case, the sequence of 1's and 0's in the fingerprint register 104 may represent the most-recent history of load instruction data cache hits and misses, where a '0' indicates a data cache miss and a '1' indicates a data cache hit. Also, if the intent of the optimization was to ensure that all loads leading up to a given instruction were data cache hits, a similar procedure might extract a data cache hit/miss fingerprint to ensure that the expected sequence of hits and misses was occurring, thereby verifying that the optimization had performed correctly. Since cache hits may be affected by external events such as cache usage by other threads sharing the cache, however, minor perturbations of the measured fingerprint from the expected fingerprint 165 may be ignored. For example, the criterion for verification of compiler operation might be that the hamming distance between the expected and actual fingerprints is less than a threshold value. If the hamming distance between the expected and actual fingerprints (i.e., the actual value in the actual fingerprint register 104 and the corresponding expected fingerprint 165) is not less than the threshold value, a lightweight interrupt such as the EBB is caused. Otherwise, the optimization is verified and the program continues uninterrupted.

In some embodiments, the fingerprint circuit 110 may poll such a fingerprint register 104 upon entry to a method or at a function call by the fingerprint circuit 110, and a verification of the compiler optimization is recognized if the actual fingerprint in the fingerprint register 104 is within a specified distance (e.g. a hamming distance for a fingerprint consisting of a sequence of "1"s and "0"s representing sequential cache hits and misses), of the expected value of the specified fingerprint (at the time of polling).

FIG. 3 depicts a fingerprint recognition function/detector of the fingerprint circuit 110 according to an embodiment. The fingerprint circuit 110 is configured to automatically detect an arbitrary sequence of events leading up to a specific instruction. The instruction at which to sample the fingerprint register 104 may be identified by an instruction prefix or suffix, where the prefix or suffix consists of an additional field either at the beginning or end of the instruction image (i.e., the instruction). FIG. 6A depicts an instruction 602 with an example prefix field 604 for a prefix (e.g., XYZ), and FIG. 6B depicts an instruction 606 with an example suffix field 608 for a suffix (e.g., JKL), according to an embodiment. In FIGS. 6A and 6B, the prefix and suffix may be bits added to the beginning or end of the instruction images 602, 606. Most instructions have an opcode field and one or more operand fields. In the example instructions 602, 606, the instruction opcode is in the OPCODE field opcode, the destination register number (#) is in the RT field, and the source register number (#) is in the RA field, and the DI field is an input variable. The prefix field 604 is an additional field added before the instruction image, while the suffix field 608 is an additional field appended to the end of the instruction image. The prefix field 604 and the suffix field 608 can be set to a value to indicate that the respective field 604, 608 is included in the fingerprint and/or to indicate that the fingerprint 165 is sampled at that instruction.

Additionally, a special form of no operation (nop) instruction may be used to identify the instruction at which to sample the fingerprint.

In FIG. 3, the fingerprint circuit 110 may include a specified fingerprint 165 that is being monitored for and an actual fingerprint (FPA) in the fingerprint shift register 104 that receives the output of the processor 101 (e.g., from data cache 103 in this example) for the software program (e.g., software application 107). As execution proceeds, the actual sequence of fingerprint events (e.g., load hits and load misses) is shifted into the actual fingerprint register 104. The bits of the actual fingerprint in the actual fingerprint register 104 are compared against the specified fingerprint (FPS) 165 to find a match. When a match is found, the fingerprint circuit 110 determines that verification of the optimization occurs. When no match is found, the execution alerts that the intended optimization did not occur by causing a lightweight interrupt such as an event based branch (EBB). The EBB handler can then take the corresponding action.

Optionally, a fingerprint mask register (FPM) 310 may be included, and the fingerprint mask register 310 is configured to turn off certain bits when comparing against the fingerprint register 104. For example, the fingerprint circuit 110 may compare every other bit of actual fingerprint in the fingerprint register 104 against the specified fingerprint 165 based on the mask of the fingerprint mask register 310.

An example scenario is provided below for explanation purposes. In the fingerprint circuit 110, detection may be initiated with a function such as the DETECT function below. In DETECT (FPS, FPM), the specified fingerprint 165 is the expected cache hit/miss sequence, where a 0 corresponds to a miss and a 1 corresponds to a cache hit. The fingerprint mask register 310 is a bit-for-bit mask on the specified fingerprint register 104. The actual fingerprint being monitored (e.g., sequence of branches taken and not taken, or other sequence of events) is loaded into the actual fingerprint register 104 during execution of the software on the processor 101. A mask on the specified fingerprint is loaded into the fingerprint mask (FPM) register 310 in order to skip selected branch instructions or shorten the specified fingerprint 165 to less than the register length. As execution proceeds, the actual sequence of fingerprint events (branch taken/not taken, etc.) is shifted into the actual fingerprint register 104. Each bit of the actual fingerprint register 104 and specified fingerprint shift register 104 are continuously monitored over the fingerprint mask of the fingerprint mask register 310 (when utilized) in one implementation. In another implementation, the fingerprint shift register 104 begins monitoring (only) upon execution of certain instructions such as instructions containing a prefix and/or suffix as explained earlier. When the actual fingerprint in fingerprint register 104, as modified by mask 310, is equal to the expected fingerprint, the expected fingerprint 165 has been recognized and a verification of the compiler optimization occurs. The fingerprint circuit 110 may also either start or stop monitoring and comparing when a predefined end address is reached or a predefined instruction is completed, or may only compare when a predefined address is reached or predefined instruction is completed.

An embodiment may contain multiple sets of fingerprint functions/detectors, such as one set of data cache hit and miss functions/detectors for each cache level, another set of fingerprint functions/detectors for sequences of branch direction hits and misses, a set of functions/detectors of branch target hits and misses, and a set of fingerprint functions/detectors for sequences of branch instructions taken and not/taken, etc.

FIG. 4 depicts an example expected fingerprint 165 according to an embodiment. In an example scenario, there may be an operation that causes the compiler 120 to initially use an arithmetic unit 170 to compute results serially, or one at a time. However, an optimizing compiler 120 may optimize the operation with the intent to use a vector unit 175, which computes results in parallel, in order to execute fewer instructions for the operation and improve its performance. After such an optimization, overall performance may have improved. However, it is beneficial to have a capability that can verify that a specific intended optimization (i.e., the use of a vector unit 175 instead of an arithmetic unit 170) is actually occurring since there is a possibility that the overall performance may have improved due to other types of optimization that were performed during the optimization process. In the computer system 100 of FIG. 1, embodiments are able to efficiently provide such verification using a fingerprint table 165, as shown in detail in FIG. 4, and in an example fingerprint recognizer/detector 900 in FIG. 9.

Turning now to FIG. 4, the fingerprint circuit 110 may utilize an expected fingerprint 165 in FIG. 4 to verify that a compiler 120 has performed an intended optimization such as the use of a vector unit 175 according to an embodiment. For example, ADDR1 is the starting address at which use of the vector unit 175 is to be monitored. ADDR2 is the address at which use of the vector unit 175 is no longer monitored. Also, N is the number of expected vector instructions that are to be verified to complete between the completion of the instruction at ADDR1 and the completion of the instruction at ADDR2. OPCODE is the operation code of the vector instruction for which usage is being measured. Embodiments use multiple such fingerprints, each being identical except for the OPCODE in order to recognize multiple vector instructions between the addresses instead of a single vector instruction, or they may ignore various bits of the OPCODE in order to recognize usage of such multiple vector instructions. The fingerprint circuit 110 may also have multiple such fingerprints that are all simultaneously monitored, either between the same instruction addresses or different instruction addresses.

Figure 9:
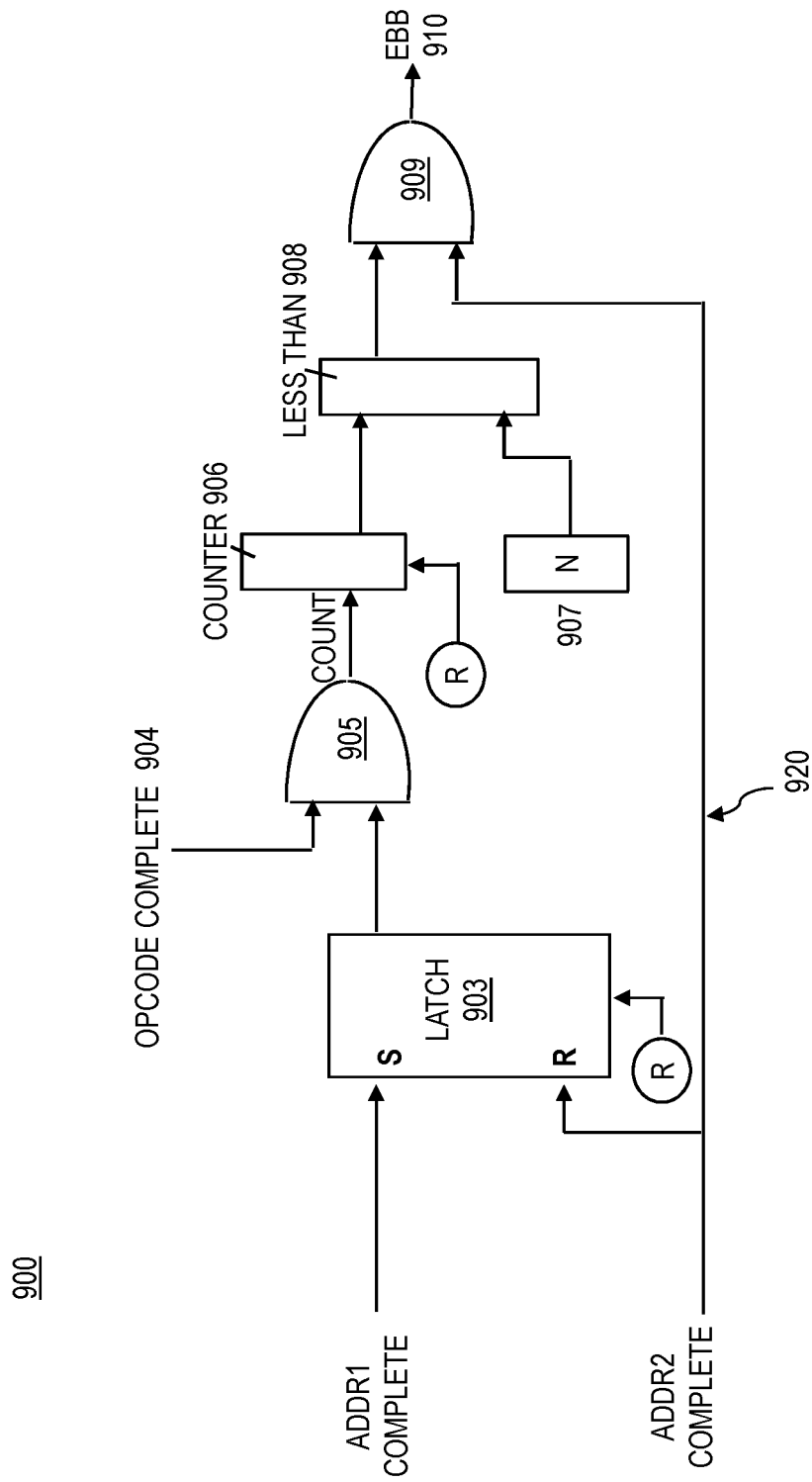
FIG. 9 depicts an example compiler optimization detector utilizing the table in FIG. 4 according to an embodiment.

According to an embodiment, FIG. 9 depicts an example fingerprint recognizer/detector 900 for recognition of fingerprints utilizing the fingerprint table 165 as shown in FIG. 4. The fingerprint circuit 110 may include one or more fingerprint recognizers/detectors 900. The logic in FIG. 9 may be initialized by resetting counter 906 and latch 903, as depicted by "R" in FIG. 9. After this initialization, latch 903 output is set to "1" when the instruction at ADDR 1 (specified in fingerprint 165 in FIG. 4) completes. Latch 903 output is sent to AND gate 905, which gates an opcode complete signal 904 to counter 906 whenever latch 903 output signal is set to 1, where the opcode is as specified in fingerprint 165 in FIG. 4. Output of counter 906 is sent to less than indicator 908, which compares output of counter 906 with a value, N (specified in fingerprint 165 in FIG. 4). Finally, less than indicator 908 is sent to AND gate 909, which outputs a signal if less than indicator is true when the instruction at ADDR2 (specified in fingerprint 165 in FIG. 4) completes. The output of AND gate 909 causes an EBB 910. Thus the EBB 910 occurs if counter 906 is less than N (907) when the instruction at ADDR2 completes. This indicates that an insufficient number of instructions with OPCODE (specified in FIG. 4) have completed between the completion of the instruction at ADDR1 and the instruction at ADDR2, and therefore that the intended optimization has not occurred. If counter 906 is not less than N (907) when the instruction at ADDR2 is completed, then a sufficient number of vector instructions have completed between ADDR1 and ADDR2, and no EBB occurs. FIG. 4 and FIG. 9 are shown for illustrative purposes only; a compiler optimization fingerprint detector such as is shown in these figures may monitor any appropriate set of instruction completions and may, in some embodiments, simultaneously monitor multiple sets of instruction completions either between the same or different start and end addresses.

FIGS. 7 and 8 depict an example of a 4-iteration loop that is unrolled in order to minimize stall cycles. Referring to FIG. 7, there may be stall cycles prior to add, sd, and bne instructions since these instructions are dependent on the previous instruction. Thus, the stall fingerprint 165 that detects the number of stalls between the ldx and bne instructions might, for example, have a value of 3. When the loop 700 has been unrolled as depicted in FIG. 8 so as to minimize dependencies and the associated stalls, the stall fingerprint might be expected to have a value of 0 since there are no instructions that have a dependency on the previous instruction.

Figure 10:
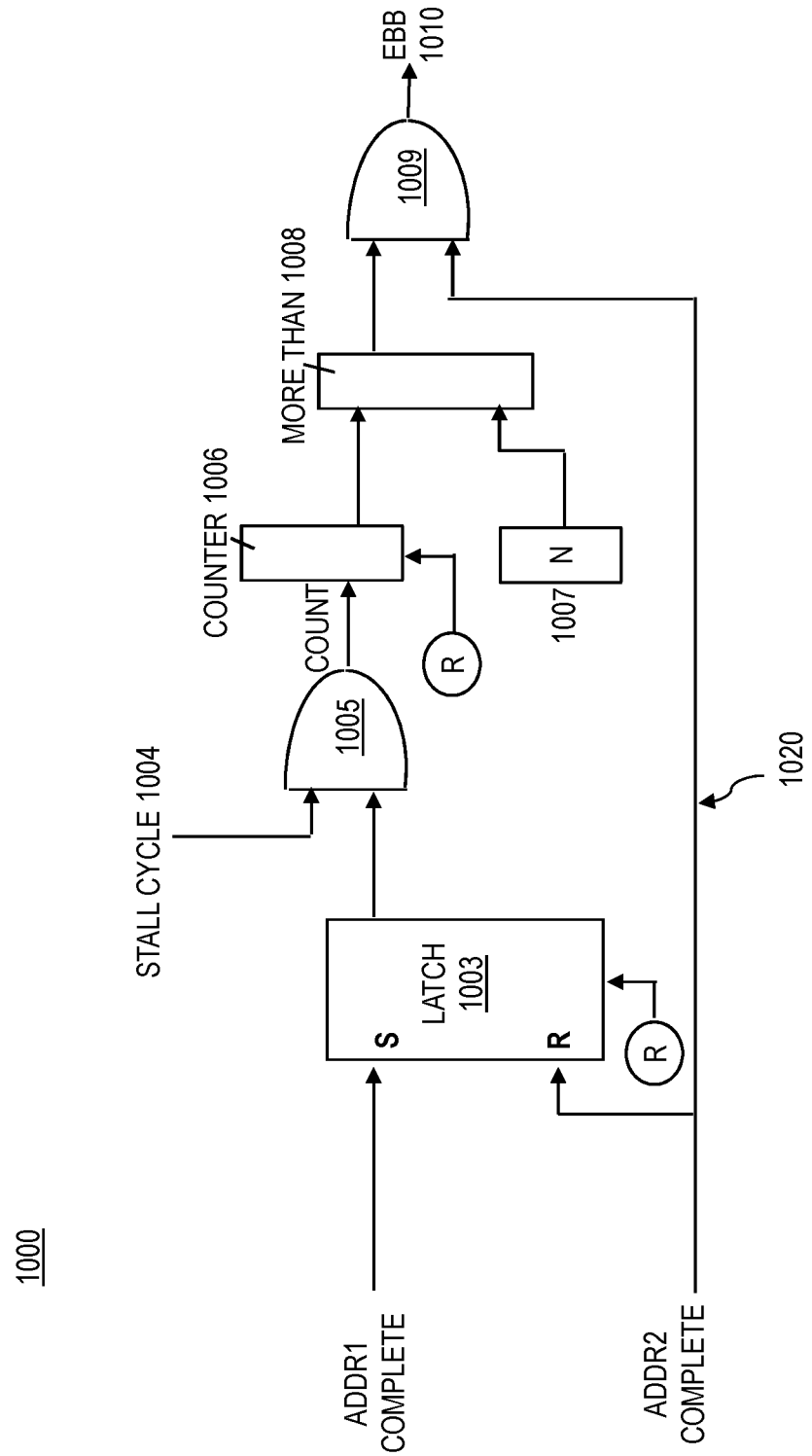
FIG. 10 depicts an example compiler optimization detector configured to verify the optimization in FIG. 8 according to an embodiment.

An embodiment may utilize logic such as that shown in FIG. 10 in order to recognize stall fingerprints such as shown in fingerprint 165 in FIG. 11. Such fingerprints 165 consist of a specified maximum number of stalls that are expected to occur in the processor pipeline 102 between two instructions. For example, ADDR1 is the starting address at which stalls are to be counted, ADDR2 is the address at which stall counting is stopped and N is the maximum expected number of expected stalls to have occurred between the completion of the instruction at ADDR1 and the completion of the instruction at ADDR2.

FIG. 10 depicts an example fingerprint recognizer/detector 1000 for recognition of stall cycle fingerprints described in FIG. 11 according to an embodiment. The logic in FIG. 10 is initialized by resetting counter 1006 and latch 1003, as depicted by "R" in FIG. 10. After this initialization, latch 1003 output is set to "1" when the instruction at ADDR 1 (specified in fingerprint 165 in FIG. 11) completes. Latch 1003 output is sent to AND gate 1005, which gates a stall signal 1004 to counter 1006 whenever latch 1003 output signal is set to 1. Output of counter 1006 is sent to more than indicator 1008, which compares output of counter 1006 with a value, N (specified in fingerprint 165 in FIG. 11). Finally, less than indicator 1008 is sent to AND gate 1009, which outputs a signal if more than indicator is true when the instruction at ADDR2 (specified in fingerprint 165 in FIG. 11) completes. The output of AND gate 1009 causes an EBB 1010. Thus, the EBB 1010 occurs if counter 1006 is more than N (1007) from the stall fingerprint table 165 in FIG. 11 when the instruction at ADDR2 completes. This indicates that an excessive number of pipeline stalls have occurred between the completion of the instruction at ADDR1 and the instruction at ADDR2, and therefore that the intended optimization has not occurred. If counter 1006 is not more than N (1007) when the instruction at ADDR2 is completed, then less than or equal to N stalls (i.e. an expected number) have occurred between ADDR1 and ADDR2, and no EBB occurs. FIGS. 7, 8, 10, and 11 are shown for illustrative purposes only; a compiler optimization fingerprint detector such as is shown in these figures may monitor any appropriate set of instruction completions and may, in some embodiments, simultaneously monitor multiple sets of instruction completions either between the same or different start and end addresses.

Also, an embodiment of a fingerprint recognizer/detector may be used to verify that a particular fingerprint does not appear after optimization. For example, it is assumed that prior to optimization a program exhibited a particular cache hit/miss sequence that was causing a performance problem. After optimizing the code, the fingerprint circuit 110 may be configured to cause an EBB if that particular sequence (fingerprint) continued to appear, thus determining that the optimization did not take effect. However, when the fingerprint 165 does not appear (i.e., no match), the fingerprint circuit 110 is configured to determine that that optimization has taken its intended effect.

Various embodiments include a fingerprint recognition function, or fingerprint module. There may be a respective fingerprint recognition function for each type of fingerprint being detected. Each type of fingerprint 165 and/or each combination of fingerprints 165 is indicative of a compiler optimization executed on the processor 101, software, and/or other hardware of the computer system 100. An embodiment may utilize multiple types of fingerprints, such that whenever all (or a subset of) such fingerprints are simultaneously recognized, compiler verification is indicated.

FIG. 5 is a flow chart of a computer implemented method 500 for automated compiler operation verification via the fingerprint circuit 110 according to an embodiment.

At block 505, the fingerprint circuit(s) 110 is initialized. An optimization is performed to the compiler 120 that compiles software (e.g., application 107, source code 108, hypervisor 106, etc.), and the compiler 120 is configured to execute on the processor 101 of the computer system 100

At block 510, the fingerprint circuit 110 is configured to determine whether a fingerprint is present in the output of the software (e.g., hypervisor 106, application 107, source code 108) that is currently executing on the processor 101 of the computer system 100, where the fingerprint 165 comprises a representation of a sequence of behavior that occurs on the processor 101 while the software is executing and where the software is compiled by the compiler 120. The fingerprint 165 is configured to correspond to the optimization of the compiler 120, such that the one fingerprint 165 verifies one optimization, another fingerprint 165 verifies another optimization, and so forth. In order to find the match and/or know when to start looking for the evidence of the optimization, the fingerprint circuit 110 may continuously monitor for the presence of a specified fingerprint related to one or more pipelines 102, cache units (103), branch predictors 160, branch predictor buffers 162, fingerprint tables 165, arithmetic units 170, vector units 175, completion units 180, etc., at block 510, and/or may only monitor for the presence of a specified fingerprint related to instructions at various addresses at block 525.

At block 515, the fingerprint circuit 110 is configured to, in response to determining that the fingerprint 165 is not present in the software currently executing on the processor 101, determine that the optimization to the compiler 120 has not occurred. In other words, the optimization did not have the intended consequence.

At block 520, in response to determining that the fingerprint 165 is present in the software executing on the processor 101, the fingerprint circuit 110 is configured to verify that the optimization of the compiler 120 has occurred. In other words, the optimization did have the intended consequence.

Determining whether the fingerprint 165 is present in the software that is currently executing on the processor 101 of the computer system 100 occurs in response to identifying that an instruction at a specified address (e.g., ADDR2 in fingerprint table 165) has completed. In response to identifying the completion of the last instruction for which the fingerprint is determined, fingerprint circuit 110 is configured to compare a value in the fingerprint register 104 to the expected fingerprint (e.g., expected fingerprint 165) in order to determine whether the fingerprint is present in the fingerprint register 104.

Identifying the instruction address of the instruction that is the last instruction in a code segment that has been optimized causes output of the software currently executing on the processor 101 to be placed into a fingerprint register 104, such that a value in the fingerprint register 104 is compared to the fingerprint 165 in order to determine whether the fingerprint is present in the fingerprint register 104.

Determining whether the fingerprint 165 is present in the software that is currently executing on the processor 101 of the computer system 100 occurs in response to one or more instruction addresses of the software currently matching one or more predefined instruction addresses.

The fingerprint 165 is defined to have the representation of the sequence of behavior that occurs when the optimization has occurred. For example, the fingerprint circuit 110 may detect a sequence of cache hits and cache misses for load instructions to determine if a prespecified sequence has occurred. If the prespecified sequence occurs, the fingerprint circuit 110 determines that the compiler optimization successfully occurred. Otherwise if the prespecified sequence has not occurred, the fingerprint circuit 110 determines that the compiler optimization did not occur. Alternatively, the fingerprint circuit 110 may count the stalls on a processor pipeline 102 between two addresses (ADDR1 and ADDR2) to determine if less than N stalls occurred. If less than N stalls occurs, the fingerprint circuit 110 determines that the compiler optimization successfully occurred. Otherwise if N or more stalls occurred, the fingerprint circuit 110 determines that the compiler optimization did not occur. Other embodiments may count other events that can be used to verify a particular compiler optimization instead of or in addition to stalls and hits/misses.

The fingerprint 165 corresponds to an intended change designed to occur for a specified number of instructions following the instruction address at which the intended change is the optimization by the compiler 120. For example, the intended change may be to unroll the loop 700, perform addition using a vector (or an array of numbers) that performs multiple additions at one time, etc.

Technical effects and benefits include improved performance of a computer processor. Embodiments provide techniques and hardware to verify a wide variety of sequential program behavior patterns and record them in a fingerprint. Without embodiments, verification of such sequential behavior patterns required time-consuming manual analysis of instruction traces and/or use of performance monitor results. By facilitating verification in embodiments, optimizing compilers can be much more easily and thoroughly verified than was previously possible.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for automated compiler operation verification, the method comprising:
   in response to performing an optimization to a compiler configured to execute on a processor of a computer system, determining whether a fingerprint is present in software that is currently executing on the processor of the computer system, wherein the software is compiled by the compiler, wherein the fingerprint comprises a representation of a sequence of behavior that occurs on the processor while the software is executing, and wherein the fingerprint is configured to correspond to the optimization of the compiler;
   in response to determining that the fingerprint is not present in the software currently executing on the processor, determining that optimization to the compiler has not occurred; and
   in response to determining that the fingerprint is present in the software executing on the processor, verifying that the optimization of the compiler has occurred;
   wherein determining whether the fingerprint is present in the software that is currently executing on the processor of the computer system occurs in response to one or more instruction addresses of the software currently matching one or more predefined instruction addresses.

2. The method of claim 1, wherein determining whether the fingerprint is present in the software that is currently executing on the processor of the computer system occurs in response to identifying an instruction address of an instruction that is optimized.

3. The method of claim 2, further comprising, in response to identifying the instruction address of the instruction that is optimized, comparing a value in a fingerprint register to the fingerprint in order to determine whether the fingerprint is present in the fingerprint register.

4. The method claim 2, wherein identifying the instruction address of the instruction that is optimized causes output of the software currently executing on the processor to be placed into a fingerprint register, such that a value in the fingerprint register is compared to the fingerprint in order to determine whether the fingerprint is present in the fingerprint register.

5. The method of claim 1, wherein the fingerprint is defined to have the representation of the sequence of behavior that occurs when the optimization has occurred.

6. The method of claim 2, wherein the fingerprint corresponds to an intended change designed to occur for the instruction at the instruction address in which the intended change is the optimization by the compiler.

7. A computer program product for implementing automated compiler operation verification, the computer program product comprising:
a computer readable storage medium having program instructions embodied therewith, the program instructions readable by a processing circuit to cause the processing circuit to perform a method comprising:
in response to performing an optimization to a compiler configured to execute on a processor of a computer system, determining whether a fingerprint is present in software that is currently executing on the processor of the computer system, wherein the software is compiled by the compiler, wherein the fingerprint comprises a representation of a sequence of behavior that occurs on the processor while the software is executing, and wherein the fingerprint is configured to correspond to the optimization of the compiler;
in response to determining that the fingerprint is not present in the software currently executing on the processor, determining that optimization to the compiler has not occurred; and
in response to determining that the fingerprint is present in the software executing on the processor, verifying that the optimization of the compiler has occurred;
wherein determining whether the fingerprint is present in the software that is currently executing on the processor of the computer system occurs in response to one or more instruction addresses of the software currently matching one or more predefined instruction addresses.

8. The computer program product of claim 7, wherein determining whether the fingerprint is present in the software that is currently executing on the processor of the computer system occurs in response to identifying an instruction address of an instruction that is optimized.

9. The computer program product of claim 8, the method further comprising, in response to identifying the instruction address of the instruction that is optimized, comparing a value in a fingerprint register to the fingerprint in order to determine whether the fingerprint is present in the fingerprint register.

10. The computer program product claim 8, wherein identifying the instruction address of the instruction that is optimized causes output of the software currently executing on the processor to be placed into a fingerprint register, such that a value in the fingerprint register is compared to the fingerprint in order to determine whether the fingerprint is present in the fingerprint register.

11. The computer program product of claim 7, wherein the fingerprint is defined to have the representation of the sequence of behavior that occurs when the optimization has occurred.

12. The computer program product of claim 8, wherein the fingerprint corresponds to an intended change designed to occur for the instruction at the instruction address in which the intended change is the optimization by the compiler.

13. A computer system for automated compiler operation verification, the system comprising:
a memory; and
a processor, communicatively coupled to the memory, the computer system configured to perform a method comprising:
in response to performing an optimization to a compiler configured to execute on the processor of the computer system, determining whether a fingerprint is present in software that is currently executing on the processor of the computer system, wherein the software is compiled by the compiler, wherein the fingerprint comprises a representation of a sequence of behavior that occurs on the processor while the software is executing, and wherein the fingerprint is configured to correspond to the optimization of the compiler;
in response to determining that the fingerprint is not present in the software currently executing on the processor, determining that optimization to the compiler has not occurred; and
in response to determining that the fingerprint is present in the software executing on the processor, verifying that the optimization of the compiler has occurred;
wherein determining whether the fingerprint is present in the software that is currently executing on the processor of the computer system occurs in response to one or more instruction addresses of the software currently matching one or more predefined instruction addresses.

14. The system of claim 13, wherein determining whether the fingerprint is present in the software that is currently executing on the processor of the computer system occurs in response to identifying an instruction address of an instruction that is optimized.

15. The system of claim 14, the method further comprising, in response to identifying the instruction address of the instruction that is optimized, comparing a value in a fingerprint register to the fingerprint in order to determine whether the fingerprint is present in the fingerprint register.

16. The system claim 14, wherein identifying the instruction address of the instruction that is optimized causes output of the software currently executing on the processor to be placed into a fingerprint register, such that a value in the fingerprint register is compared to the fingerprint in order to determine whether the fingerprint is present in the fingerprint register.

17. The system of claim 13, wherein the fingerprint is defined to have the representation of the sequence of behavior that occurs when the optimization has occurred.

* * * * *